United States Patent
Kosaki

(10) Patent No.: US 6,473,627 B1
(45) Date of Patent: Oct. 29, 2002

(54) MOBILE COMMUNICATION SYSTEM AND MOBILE COMMUNICATION METHOD

(75) Inventor: Hitoshi Kosaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/319,177

(22) PCT Filed: Jul. 22, 1998

(86) PCT No.: PCT/JP98/03278

§ 371 (c)(1),
(2), (4) Date: Jun. 3, 2000

(87) PCT Pub. No.: WO00/05830

PCT Pub. Date: Feb. 3, 2000

(51) Int. Cl.[7] .................................................. H04M 1/00
(52) U.S. Cl. ........................ 455/562; 455/560; 455/552
(58) Field of Search ................................... 455/552, 553, 455/561, 560, 403, 436, 439, 525, 550, 437, 438, 432

(56) References Cited

U.S. PATENT DOCUMENTS

| | | | |
|---|---|---|---|
| 5,260,988 A | | 11/1993 | Schellinger et al. |
| 5,732,360 A | | 3/1998 | Jarett et al. |
| 5,774,805 A | * | 6/1998 | Zicker ......................... 455/426 |
| 5,781,865 A | * | 7/1998 | Gammon ..................... 455/561 |
| 5,822,693 A | * | 10/1998 | Harrison ..................... 455/432 |
| 6,052,585 A | * | 4/2000 | Homma ....................... 455/426 |
| 6,052,595 A | * | 4/2000 | Schellinger et al. ........ 455/450 |
| 6,125,283 A | * | 9/2000 | Kolev et al. ................. 455/552 |
| 6,229,996 B1 | * | 5/2001 | Uistola ........................ 455/168.1 |

FOREIGN PATENT DOCUMENTS

| | | |
|---|---|---|
| GB | 2 257 334 A | 1/1993 |
| JP | 6327148 | 2/1988 |
| JP | 921861 | 1/1997 |
| JP | 09214234 | 8/1997 |

OTHER PUBLICATIONS

Grube, G., et al., "In–Building Wireless Coverage Using A Second Mode," May 1996, pp. 66–68, Motorola, Inc., Motorola Technical Developments.

* cited by examiner

*Primary Examiner*—Dwayne Bost
*Assistant Examiner*—Sonny Trinh
(74) *Attorney, Agent, or Firm*—Rothwell, Figg, Ernst & Manbeck

(57) ABSTRACT

A mobile communication system according to the present invention includes: a radio base station for transmitting and receiving the electromagnetic waves of a circuit switching type radio communication system and the electromagnetic waves of a packet switching type radio communication system; and a communication terminal including an antenna for transmitting and receiving the electromagnetic waves of the circuit switching type radio communication system and the electromagnetic waves of the packet switching type radio communication system, a tracking unit for directing the orientation of the antenna to an arrival direction of the electromagnetic waves, a receiver for demodulating the electromagnetic waves of the circuit switching type radio communication system and the electromagnetic waves of the packet switching type radio communication system which are received, a transmitter for modulating the contents to be transmitted into the electromagnetic waves of the circuit switching type radio communication system and the electromagnetic waves of the packet switching type radio communication system, a handset for indicating predetermined information to the exterior and receiving an instruction from the exterior, and a controller for controlling the above respective units and implementing an initial acquiring procedure from which a tracking procedure or the like is omitted when a predetermined condition is satisfied, for example, at the time of switching from the circuit switching type radio communication system to the packet switching type radio communication system. Accordingly, a period of time required when switching the radio communication systems can be reduced.

15 Claims, 12 Drawing Sheets

MOBILE COMMUNICATION SYSTEM AND MOBILE COMMUNICATION METHOD

TECHNICAL FIELD

The present invention relates to a mobile communication system and a mobile communication method which is capable of reducing "service disable period" occurring when the communication terminal side switches systems in a communication terminal side which is capable of utilizing a plurality of radio communication system.

BACKGROUND ART

In a communication terminal which is capable of utilizing a plurality of radio communication system, when one system is switched to another system at the communication terminal side, even if these systems have similar electromagnetic wave (electric wave) environments, the operation starts from the normal initial sequences of the respective systems.

For that reason, for example, in the case where a user intends to switch from a system 1 to a system 2, a long period of time is required until a line on the system 2 side is acquired and the service of the system 2 can be actually supplied to the user.

In more detail, as shown in FIG. 12, the initial sequence is roughly classified into (1) tracking in Steps 20 to 22 (in the case where an antenna having directivity is used), (2) frequency correction in Steps 23 to 24, and (3) evaluation of a radio line in Steps 25 to 27. Hereinafter, the respective processes will be described with reference to specific examples.

FIG. 11 shows an arrangement of a conventional mobile communication terminal. In the figure, reference numeral 1 denotes an antenna for transmitting and receiving electromagnetic waves; 2, a tracking unit for directing the orientation of the antenna 1 to an arrival direction of the electromagnetic waves; 3, a receiver for demodulating the received electromagnetic waves; 4, a transmitter for modulating the contents to be transmitted to electromagnetic waves; 5, a handset for conducting indication for the user or receiving an instruction from the user; 6, a controller for controlling the above-mentioned tracking unit 2 to the handset 5; and 100 is a communication terminal.

Also, in the figure, reference numeral 61 denotes a system switching function section; 62 is a control function section for the system 1; and 63 is a control function section for the system 2.

The conventional communication terminal operates as follows: Upon turning on a power supply of the communication terminal 100, the controller 6 first instructs an initial acquirement frequency inputted from the handset 5 by the user (or stored in the controller 6) to the receiver 3 to conduct "an instruction of wide-band acquiring operation" of an electromagnetic wave which is relatively wide in received band (in the figure, those instructions are mentioned as "receiver control signal").

Also, the controller 6 instructs the tracking unit 2 to "search" the arrival direction of the electromagnetic waves simultaneously. upon receiving this instruction, the tracking unit 2 successively monitors a receive state signal (a signal indicative of a receive state such as a receiving signal strength or a bit error rate) obtained from the receiver 3 while changing the orientation of the antenna 1, thus controlling the direction of the antenna 1 so as to direct the antenna 1 to a direction excellent in the electromagnetic wave state. Further, the tracking unit 2 notifies the controller 6 of "completion of search" after the antenna 1 has been directed in the direction excellent in the electromagnetic wave state. After that, the tracking unit 2 controls the antenna so as to maintain the direction excellent in the electromagnetic wave state.

Subsequently, upon being notified of "completion of search" by the tracking unit 2, the controller 6 transmits the receiver 3 the receiver control signal which is called "frequency correction" to switch from the receive of wide-band electromagnetic waves to the receive of narrow-band electromagnetic waves with respect to the same initial acquirement frequency and to start a frequency shift correction of the subject communication terminal 100. The controller 6 confirms that the correction can be sufficiently made from the receive state signal obtained by the receiver 3 at a timing when the correction is completed.

Finally, the controller 6 transmits to the receiver 3 a frequency to be received for actually conducting communication which is inputted from the handset 5 by the user (or stored in the controller 6), as well as the receiver control signal which is called "normal receiving operation", thereby starting to receive the frequency for conducting communication (in this situation, the receiver 3 conducts the narrow-band receive and corrects the frequency by use of a correction value of the frequency shift which has been obtained in advance). The controller 6 evaluates a state of the line on the basis of the receive-state signal obtained at this time and then permits the user to conduct communication upon confirmation that sufficient receive can be made.

The communication terminal in the above-described conventional mobile communication system suffers from such a problem that when the user is switching from one system to another system, the acquiring operation of an artificial satellite is caused to be made as described above although the same direction must be maintained as it is because the same artificial satellite is used.

Also, there arises such a problem that the above-described frequency correction is caused to made, though the same frequency correction is applied because the same artificial satellite is used, the base station also uses the same reference frequency, and a deviation of frequency is the same.

Further, there arises such a problem that the above-described evaluation of a radio line is conducted although the possibility of having substantially the same quality of the radio line is high because the same artificial satellite is used, and the base station is also the same.

For those reasons, there arises such a problem that a period of time during which communication service is disenabled occurs for about 20 seconds in the above-described conventional communication terminal at the time of switching from one system to another system.

The present invention has been made in order to solve the above-described problems, and an object of the present invention is to provide a mobile communication system and a mobile communication method which enable a communication terminal to remarkably reduce an initial sequence by the application of a fact that systems to be switched therebetween have very similar electromagnetic wave environments.

In other words, in recent years, a large number of radio communication systems have been proposed, and commercial services have been started. Up to now, a communication terminal has been provided for each of those communication systems, however, a demand that a plurality of systems are utilized by one communication terminal is being increased. The present invention relates to a communication terminal which is capable of utilizing a plurality of systems, and an object of the present invention is to obtain a communication terminal by which the user can quickly receive a service with a reduction in a period of time required for switching from one system to another system.

DISCLOSURE OF THE INVENTION

A mobile communication system according to the present invention comprises: a radio base station for transmitting and receiving the electromagnetic waves of a first radio communication system and the electromagnetic waves of a second radio communication system; and a communication terminal having an antenna for transmitting and receiving the electromagnetic waves of the first radio communication system and the electromagnetic waves of the second radio communication system, a tracking unit for directing the orientation of the antenna to an arrival direction of the electromagnetic waves, a receiver for demodulating the electromagnetic waves of the first radio communication system and the electromagnetic waves of the second radio communication system which are received, a transmitter for modulating the contents to be transmitted into the electromagnetic waves of the first radio communication system and the electromagnetic waves of the second radio communication system, a handset for indicating predetermined information to the exterior and receiving an instruction from the exterior, and a controller for controlling the above respective units and implementing an initial acquiring procedure from which a predetermined procedure is omitted when a predetermined condition is satisfied at the time of switching from the first radio communication system to the second radio communication system.

Also, in the mobile communication system according to the present invention, the controller of the communication terminal implements the initial acquiring procedure from which a tracking procedure is omitted after the radio communication systems are switched when an arrival direction of the electromagnetic waves of the first radio communication system is identical with an arrival direction of the electromagnetic waves of the second radio communication system.

Further, in the mobile communication system according to the present invention, the controller of the communication terminal implements the initial acquiring procedure from which a frequency correcting procedure is omitted after the radio communication systems are switched when a reference clock of the first radio communication system is synchronous with a reference clock of the second radio communication system.

Still further, in the mobile communication system according to the present invention, the controller of the communication terminal implements the initial acquiring procedure from which a line evaluating procedure is omitted after the radio communication systems are switched when a base station of the first radio communication system is identical with a base station of the second radio communication system.

Yet still further, in the mobile communication system according to the present invention, the controller of the communication terminal also implements the initial acquiring procedure from which a tracking procedure and a frequency correcting procedure are omitted after the radio communication systems are switched when a reference clock of the first radio communication system is synchronous with a reference clock of the second radio communication system.

Yet still further, in the mobile communication system according to the present invention, the controller of the communication terminal also implements the initial acquiring procedure from which a frequency correcting procedure and a line evaluating procedure are omitted after the radio communication systems are switched when a base station of the first radio communication system is identical with a base station of the second radio communication system.

Yet still further, in the mobile communication system according to the present invention, the controller of the communication terminal also implements the initial acquiring procedure from which a line evaluating procedure and a tracking procedure are omitted after the radio communication systems are switched when an arrival direction of the electromagnetic waves of the first radio communication system is identical with an arrival direction of the electromagnetic waves of the second radio communication system.

Yet still further, in the mobile communication system according to the present invention, the controller of the communication terminal also implements the initial acquiring procedure from which a tracking procedure, a frequency correcting procedure and a line evaluating procedure are omitted after the radio communication systems are switched when a base station of the first radio communication system is identical with a base station of the second radio communication system.

Yet still further, the mobile communication system according to the present invention further comprises a communication satellite for relaying the electromagnetic waves of the first radio communication system and the electromagnetic waves of the second radio communication system between the radio base station and the communication terminal.

Yet still further, in the mobile communication system according to the present invention, the controller of the communication terminal implements the initial acquiring procedure from which a frequency correcting procedure are omitted after the radio communication systems are switched when a first reference clock of the first radio communication system is quasi-synchronous with a first reference clock of the second radio communication system.

A mobile communication system according to the present invention comprises: a first radio base station for transmitting and receiving the electromagnetic waves of a first radio communication system having a first reference clock; a second radio base station for transmitting and receiving the electromagnetic waves of a second radio communication system having a second reference clock which is quasi-synchronous with the first reference clock; and a communication terminal having an antenna for transmitting and receiving the electromagnetic waves of the first radio communication system and the electromagnetic waves of the second radio communication system, a tracking unit for directing the orientation of the antenna to an arrival direction of the electromagnetic waves, a receiver for demodulating the electromagnetic waves of the first radio communication system and the electromagnetic waves of the second radio communication system which are received, a transmitter for modulating the contents to be transmitted into the electromagnetic waves of the first radio communication system and the electromagnetic waves of the second radio communication system, a handset for indicating predetermined information to the exterior and receiving an instruction from the exterior, and a controller for controlling the above respective units and implementing an initial acquiring procedure from which a frequency correcting procedure is omitted at the time of switching from the first radio communication system to the second radio communication system.

Also, the mobile communication system according to the present invention further comprises: a first communication satellite for relaying the electromagnetic waves of the first radio communication system between the first radio base station and the communication terminal; and a second communication satellite for relaying the electromagnetic waves of the second radio communication system between the second radio base station and the communication terminal.

In a mobile communication method according to the present invention in a mobile communication system which conducts radio communication between a radio base station having a first radio communication system and a second radio communication system and a communication terminal using the first radio communication system and the second radio communication system in common, the communication terminal implements an initial acquiring procedure from which a predetermined procedure is omitted when a predetermined condition is satisfied at the time of switching from the first radio communication system to the second radio communication system.

Also, in the mobile communication method according to the present invention, the communication terminal implements the initial acquiring procedure from which a tracking procedure is omitted after the radio communication systems are switched when an arrival direction of the electromagnetic waves of the first radio communication system is identical with an arrival direction of the electromagnetic waves of the second radio communication system.

Further, in the mobile communication method according to the present invention, the communication terminal implements the initial acquiring procedure from which a frequency correcting procedure is omitted after the radio communication systems are switched when a reference clock of the first radio communication system is synchronous with a reference clock of the second radio communication system.

Still further, in the mobile communication method according to the present invention, the communication terminal implements the initial acquiring procedure from which a line evaluating procedure is omitted after the radio communication systems are switched when a base station of the first radio communication system is identical with a base station of the second radio communication system.

BEST MODE FOR CARRYING OUT THE INVENTION

Hereinafter, the respective embodiments of the present invention will be described with reference to the drawings.

EMBODIMENT 1

Figure 1:
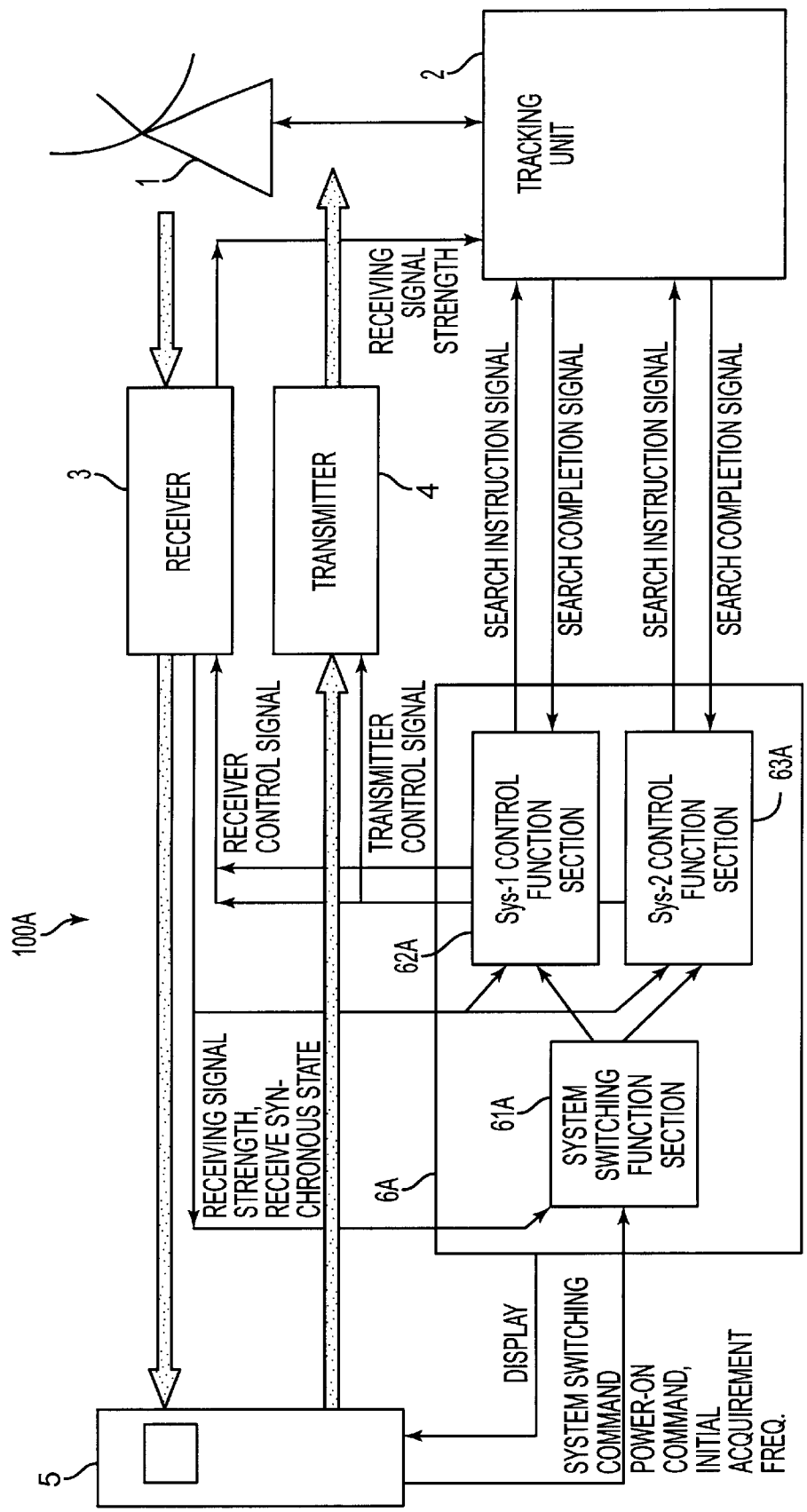
FIG. 1 is a block diagram showing an arrangement of a communication terminal of a mobile communication system in accordance with an embodiment 1 of the present invention.

A mobile communication system having a communication terminal and a base station in accordance with an embodiment 1 of the present invention will be described with reference to the drawings. FIG. 1 is a block diagram showing an arrangement of a communication terminal of a mobile communication system in accordance with an embodiment 1 of the present invention. In the respective drawings, the same reference denotes the same or like parts.

In FIG. 1, reference numeral 1 denotes an antenna for transmitting and receiving electromagnetic waves (electric waves); 2, a tracking unit for directing the orientation of the antenna 1 to an arrival direction of the electromagnetic waves; 3, a receiver for demodulating the received electromagnetic waves; 4, a transmitter for modulating the contents to be transmitted to electromagnetic waves; 5, a handset for conducting indication for the user or receiving an instruction from the user; 6A, a controller for controlling the above-mentioned tracking unit 2 to the handset 5; and 100A is a communication terminal.

In the controller 6A, the system switching function section 61, the system-1 control function section 62, and the system-2 control function section 63 which are conventional functions are replaced by a system switching function section 61A, a system-1 control function section 62A and a system-2 control function section 63A, respectively, as shown in FIG. 1. These members cooperate with each other to omit a tracking procedure. In this embodiment, for simplification, the number of available systems is two. However, in general, in case of N systems, a system-3 control function section, . . . , and a system-N control function section are provided, and these sections can be arranged in the same manner as that of this embodiment.

Figure 2:
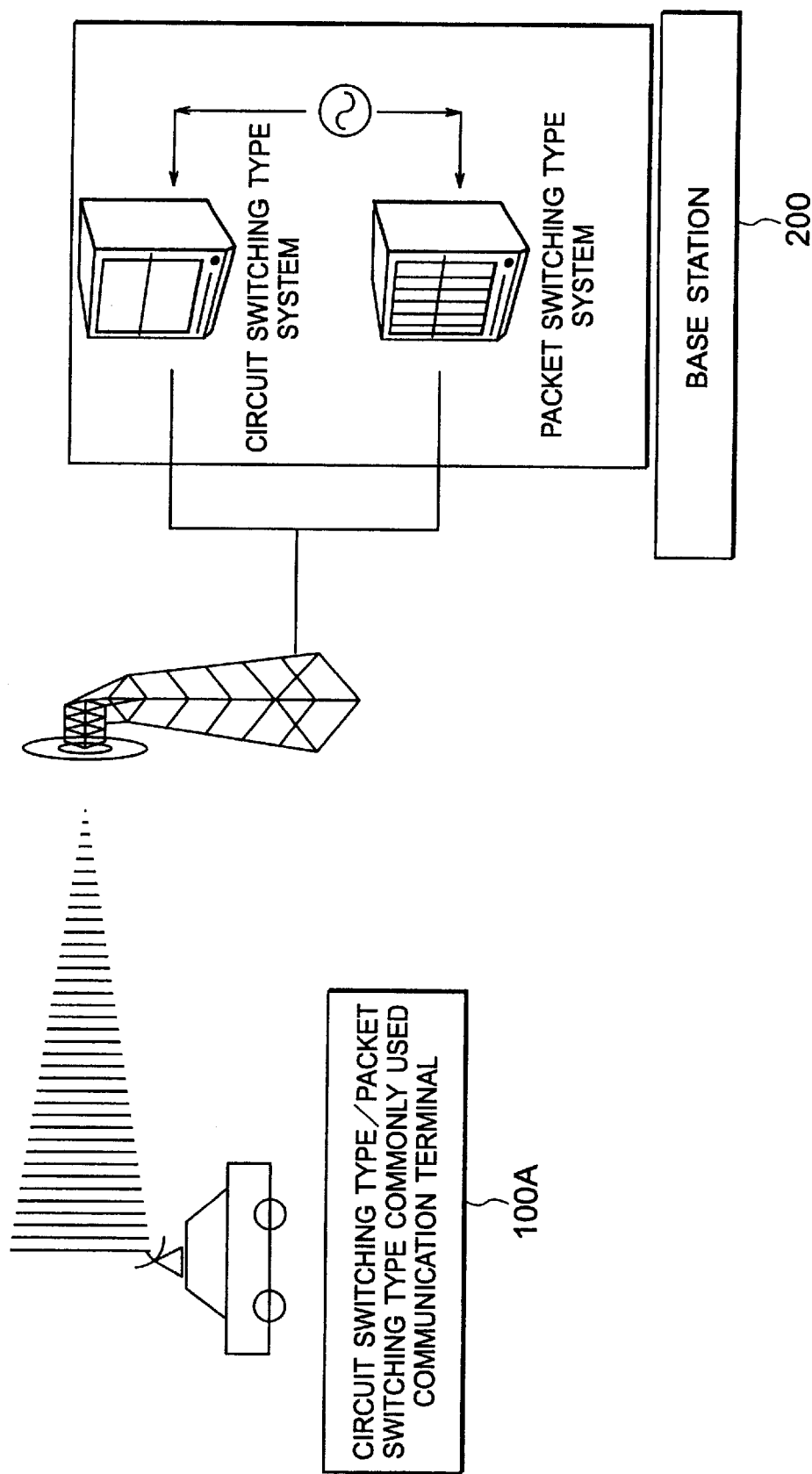
FIG. 2 is a diagram showing an arrangement of the mobile communication system in accordance with the embodiment 1 of the present invention.

FIG. 2 is a diagram showing one example in a plurality of systems is realized by one communication terminal according to the embodiment 1 of the present invention.

In FIG. 2, the communication terminal 100A is equipped in a mobile body and designed to conduct communication of the circuit switching type or communication of the packet switching type according to a user's requirement. On the other hand, the base station 200 includes a communication system of the circuit switching type and a communication system of the packet switching type therein. As a result, when being viewed from the communication terminal 00A, the communication system of the circuit switching type and the communication system of the packet switching type are identical in the arrival direction of electric waves with each other. Also, the communication terminal 100A includes the antenna 1 which is high in directivity, and the directivity of the antenna 1 can be controlled by the tracking unit 2 when the relative direction of the electromagnetic waves (electric waves) from the base station 200 changes. In this example, the plurality of systems are exemplified by the communication system of the circuit switching type and the communication system of the packet switching type. However, the same is applied to other systems, and the number of systems is not limited to two.

Figure 3:
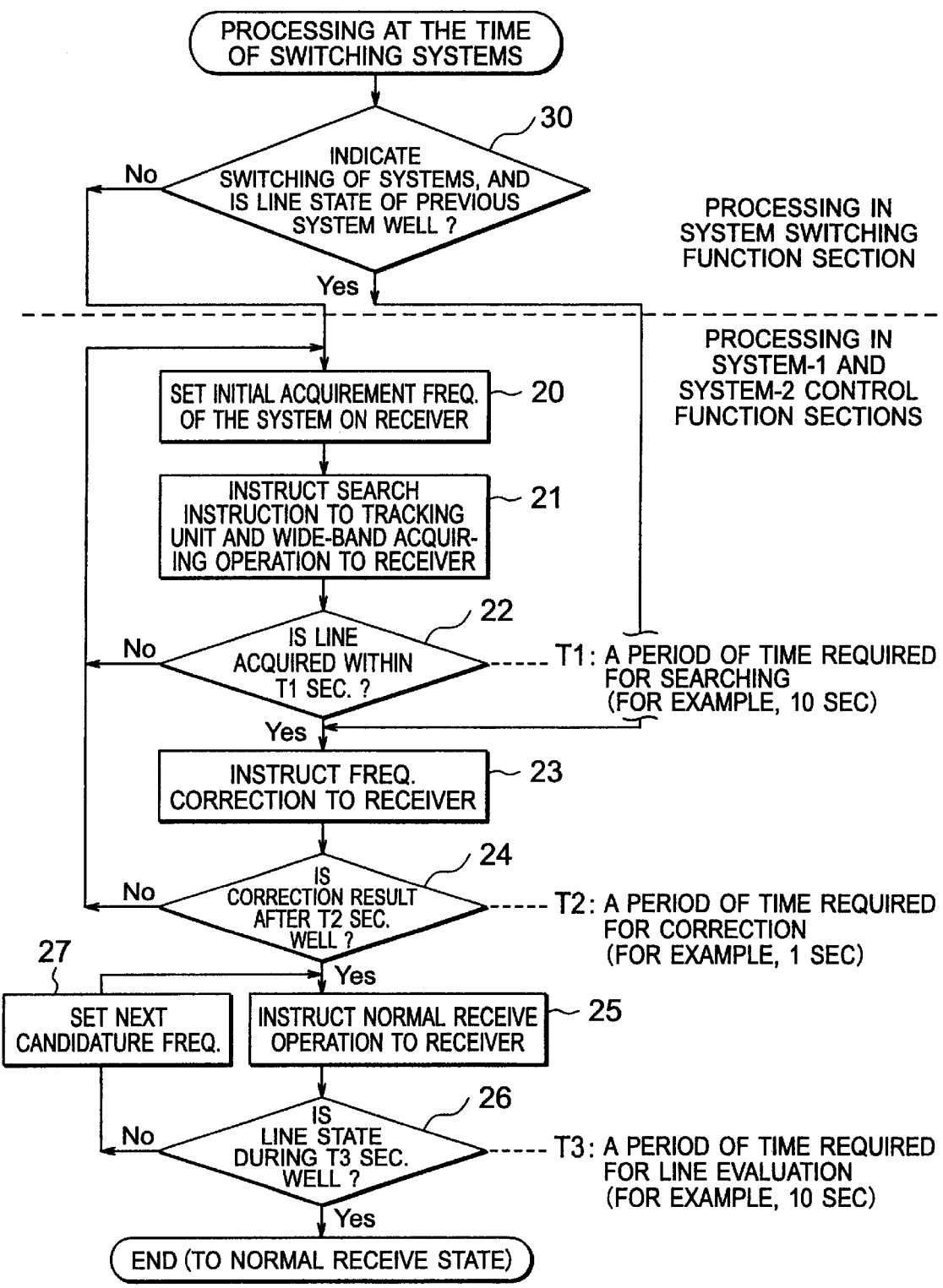
FIG. 3 is a flowchart showing the operation of the communication terminal of the mobile communication system in accordance with the embodiment 1 of the present invention.

Subsequently, the operation of the communication terminal in the mobile communication system in accordance with the embodiment 1 will be described with reference to the drawings. FIG. 3 is a flowchart showing the operation of the communication terminal in accordance with the embodiment 1.

A procedure of the system switching function section 61A, the system-1 control function section 62A and the system-2 control function section 63A is shown in detail in FIG. 3. Upon turning on a power supply of the communication terminal 100A, a power-on instruction is sent to the system switching function section 61A by the handset 5. The system switching function section 61A decides a system to be used in the same manner as that of the conventional device, and instructs the control function section 62A or 63A on a side of the system to be used to implement an initial acquiring procedure having no omission as in the conventional device. As a result, the communication terminal 100A implements the same initial acquiring procedure as that in the conventional device.

On the other hand, in the case where switching of systems is required by the user, a system switching command is sent to the system switching function section 61A from the handset 5. Then, the system switching function section 61A judges in Step 30 whether the line state of the electromagnetic waves (electric waves) of the system which is in use at present is well, or not. If it is well, the system switching function section 61A instructs the control function section 62A or 63A on the side of the system to be newly used to implement an initial acquiring procedure having omission.

That is, since the arrival directions of the electric waves of two systems before and after switching those systems are identical with each other, when the line state of the system before switching is well, it can be presumed that the line state of the system after switching is well, and the tracking procedure can be omitted in the system after switching. FIG. 2 shows a case in which the communication system of the circuit switching type and the communication system of the packet switching type are identical in reference clock with each other. However, since a frequency correcting procedure is not omitted in the embodiment 1, the reference clocks may be shifted from each other.

The control function section 62A or 63A omits the tracking procedure (Steps 20 to 22) according the above instruction and jumps up to Step 23. The control function section 62A or 63A conducts the frequency correction of the receiver 3 (Steps 23 to 24) and the line evaluation (Steps 25 to 27) once, respectively, under a relatively stabilized electromagnetic wave environment. Thereafter, the control function section 62A or 63A reaches a normal receive state so that the user's communication is enabled, thus implementing the initial acquiring procedure from which the tracking procedure is omitted.

Also, if the electromagnetic wave environment largely fluctuates in Step 24, the control function section 62A or 63A proceeds to a branch in which a frequency correction result of FIG. 3 is not well (No), that is, to Step 20, and implements the tracking procedure (Steps 20 to 22), thus being adaptable to the large fluctuation of the electromagnetic wave environment as in the conventional manner.

The branch in which the above tracking procedure (Steps 20 to 22) is implemented may be inserted to a portion at which a next candidature frequency is set when the line state is not well in a line state evaluation (Steps 25 to 27) so that the tracking procedure is implemented only once per several times.

EMBODIMENT 2

Figure 4:
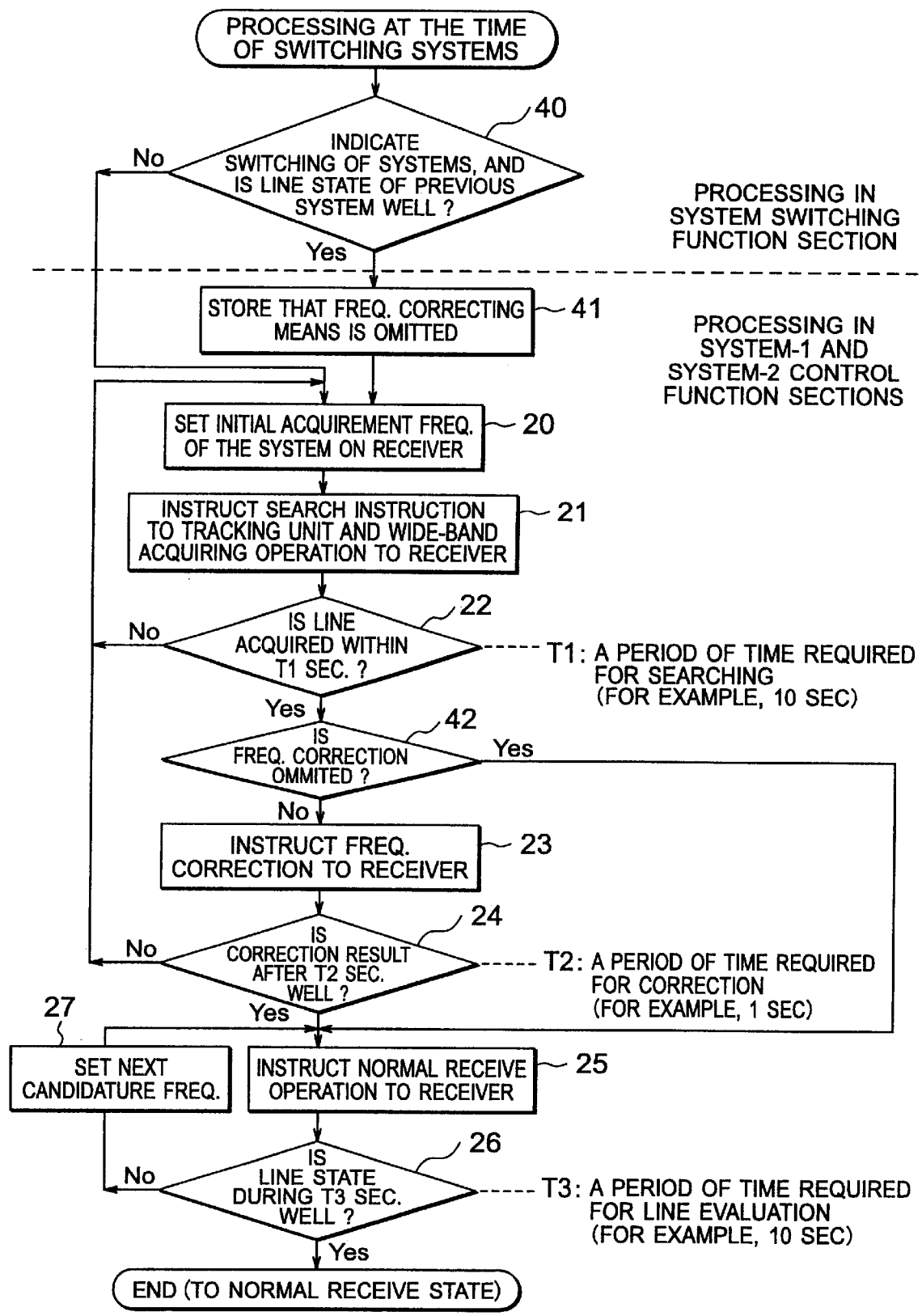
FIG. 4 is a flowchart showing the operation of a communication terminal of a mobile communication system in accordance with an embodiment 2 of the present invention.

A communication terminal in a mobile communication system in accordance with an embodiment 2 of the present invention will be described with reference to the drawings. FIG. 4 is a flowchart showing the operation of the communication terminal in accordance with the embodiment 2 of the present invention.

The embodiment 2 is an example in which the frequency correction can be omitted, to thereby enable a reduction in a switching period of time since the reference clocks of the respective systems before and after switching those systems are identical with each other, that is, synchronous with each other. The hardware arrangement of the mobile communication system and the communication terminal 100B is the same as that of the embodiment 1 shown in FIGS. 1 and 2.

However, in the embodiment 2, the base station 200 includes the communication system of the circuit switching type and the communication system of the packet switching type therein, and the reference clocks of the respective systems are required to be identical with each other. Also, in the embodiment 2, since the tracking procedure is not to be omitted, the provision of the antenna 1 high in directivity and the tracking unit 2 in the communication terminal 100B is not always required, and the equipment of the communication terminal 100B in the mobile body is not always required.

A procedure of the system switching function section 61B, the system-1 control function section 62B and the system-2 control function section 63B in accordance with the embodiment 2 is shown in detail in FIG. 4.

Upon turning on a power supply of the communication terminal 100B, the same operation as that in the above-described embodiment 1 is made. On the other hand, in the case where the switching of systems is required by the user, a system switching instruction is sent to the system switching function section 61B from the handset 5. The system switching function section 61B judges in Step 40 whether the line state of the electromagnetic waves of the system which is in use at present is well, or not. If it is well, the system switching function section 61B instructs the control function section 62B or 63B on the side of the system to be newly used to implement an initial acquiring procedure having omission.

That is, since the reference clocks of two systems before and after switching those systems are identical with each other, when the line state of the system before switching is well, it can be presumed that the line state of the system after switching is well, and the frequency correcting procedure can be omitted in the system after switching. FIG. 2 shows a case in which an antenna equipment is commonly used for the communication system of the circuit switching type and the communication system of the packet switching type, and the arrival directions of the electric waves are identical with each other. However, since the tracking procedure is not omitted in the embodiment 2, the arrival directions of the electric waves may be different between those systems.

The control function section 62B or 63B stores that the frequency correcting procedure is omitted in Step 41 according to the above instruction. Then, the control function section 62B or 63B implements the tracking procedure (Steps 20 to 22). Thereafter, the control function section 62B or 63B omits the frequency correcting procedure (Steps 23 to 24) when it stores that the frequency correcting procedure is omitted in Step 42, and conducts the line evaluation (Steps 25 to 27). Then, the control function section 62B or 63B reaches a normal receive state so that the user's communication is enabled.

The branch in which the above frequency correcting procedure (Steps 23 to 24) is implemented may be inserted after a next candidature frequency is set (Step 27) which is made when the line state is not well in a line state evaluation (Steps 25 to 27). That is, the procedure returns not to Step 25 but to Step 23.

Also, in the case where the evaluation of the line state (Steps 25 to 27) is not well, branching may be made so that the frequency correcting procedure (Steps 23 to 24) is implemented after the tracking procedure (Steps 20 to 22) is again implemented. That is, the procedure returns from Step 26 to Step 20.

EMBODIMENT 3

Figure 5:
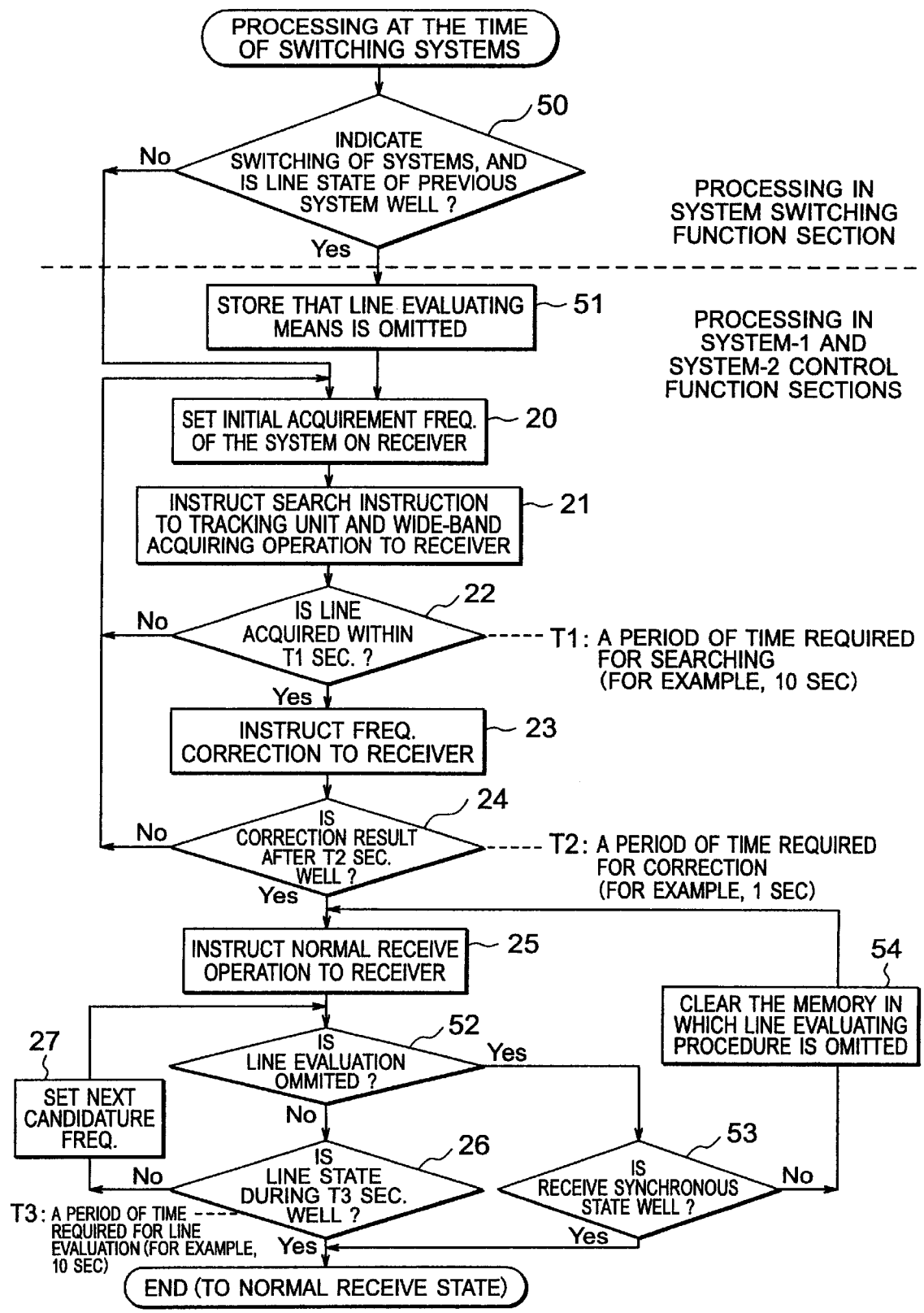
FIG. 5 is a flowchart showing the operation of a communication terminal of a mobile communication system in accordance with an embodiment 3 of the present invention.

A communication terminal in a mobile communication system in accordance with an embodiment 3 of the present invention will be described with reference to the drawings. FIG. 5 is a flowchart showing the operation of the communication terminal in accordance with the embodiment 3 of the present invention.

The embodiment 3 is an example in which the line evaluation can be omitted, to thereby enable a reduction in a switching period of time since the base stations of the respective systems before and after switching those systems are identical with each other, and there is a high possibility that the radio lines have the same quality. The hardware arrangement of the mobile communication system and the communication terminal 100C is the same as that of the embodiment 1 shown in FIGS. 1 and 2.

However, in the embodiment 3, since the tracking procedure is not to be omitted, the provision of the antenna 1 high in directivity and the tracking unit 2 in the communication terminal 100C is not always required, and the equipment of the communication terminal 100C in the mobile body is not always required.

A procedure of the system switching function section 61C, the system-1 control function section 62C and the system-2 control function section 63C in accordance with embodiment 3 is shown in detail in FIG. 5.

Upon turning on a power supply of the communication terminal 100C, the same operation as that in the above-described embodiment 1 is made. On the other hand, in the case where the switching of systems is required by the user, a system switching instruction is sent to the system switching function section 61C from the handset 5. The system switching function section 61C judges in Step 50 whether the line state of the electromagnetic waves of the system which is in use at present is well, or not. If it is well, the system switching function section 61C instructs the control function section 62C or 63C on the side of the system to be newly used to implement an initial acquiring procedure having omission.

That is, since the base stations of two systems before and after switching those systems are identical with each other, when the line state of the system before switching is well, it can be presumed that the line state of the system after switching is well, and the line evaluating procedure can be omitted in the system after switching. FIG. 2 shows a case in which an antenna equipment is commonly used for the communication system of the circuit switching type and the communication system of the packet switching type, and the arrival directions of the electric waves are identical with each other. However, since the tracking procedure is not omitted in the embodiment 3, the arrival directions of the electric waves may be different between those systems. Also, although FIG. 2 shows a case in which the reference clocks of the above-described two systems are identical with each other, the reference clocks may be shifted from each other since the frequency correcting procedure is not omitted in the embodiment 3.

The control function section 62C or 63C stores that the line evaluating procedure is omitted in Step 51 according to the above instruction. Then, the control function section 62C or 63C implements the tracking procedure (Steps 20 to 22) and the frequency correcting procedure (Steps 23 to 24). Thereafter, the control function section 62c or 63C omits the line evaluation when it stores that the line evaluating procedure is omitted in Steps 52, and reaches a normal receive state so that the user s communication is enabled. Instead of the omitted line evaluation, the control function section 62C or 63C conducts processing of whether the simplified line is well, or not, using the received level, C/N or the received synchronization signal.

The branch for implementing the normal line evaluation (Steps 25 to 27) is implemented when judgement is not well in the processing of whether the simplified line is well, or not, using the received synchronization signal or the like instead of the omitted line evaluation. That is, the memory that the line evaluating procedure is omitted is cleared in Step 54, and the procedure returns to Step 25.

EMBODIMENT 4

Figure 6:
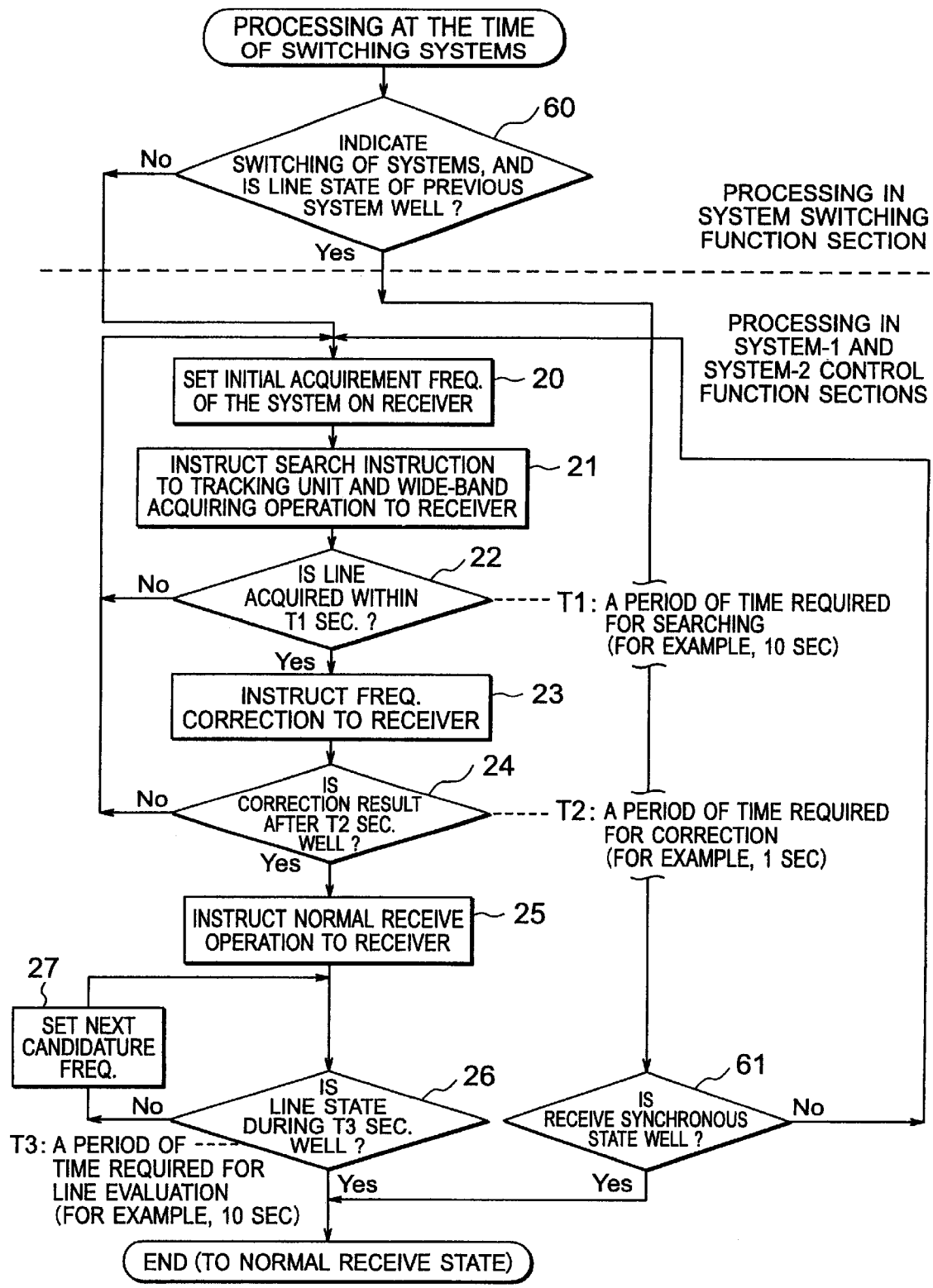
FIG. 6 is a flowchart showing the operation of a communication terminal of a mobile communication system in accordance with an embodiment 4 of the present invention.

A communication terminal in a mobile communication system in accordance with an embodiment 4 of the present invention will be described with reference to the drawings. FIG. 6 is a flowchart showing the operation of the communication terminal in accordance with the embodiment 4 of the present invention.

In the above-described embodiments 1, 2, and 3, only each one of the tracking procedures, the frequency correcting procedure and the line evaluating procedure is omitted in the initial acquiring procedure. However, all of those procedures may be omitted, or any two procedures are omitted from the initial acquiring procedure.

A procedure of the system switching function section 61D, the system-1 control function section 62D and the system-2 control function section 63D is shown in detail in FIG. 6. Other arrangements and constructions are identical with those of the above-described embodiment 1.

FIG. 6 shows an example in which all of three kinds of processes are omitted. However, the omission of only two arbitrary kinds of processes can be readily realized by making a branch corresponding to non-omitted one proceed to only non-omitted side in the figure.

EMBODIMENT 5

Figure 7:
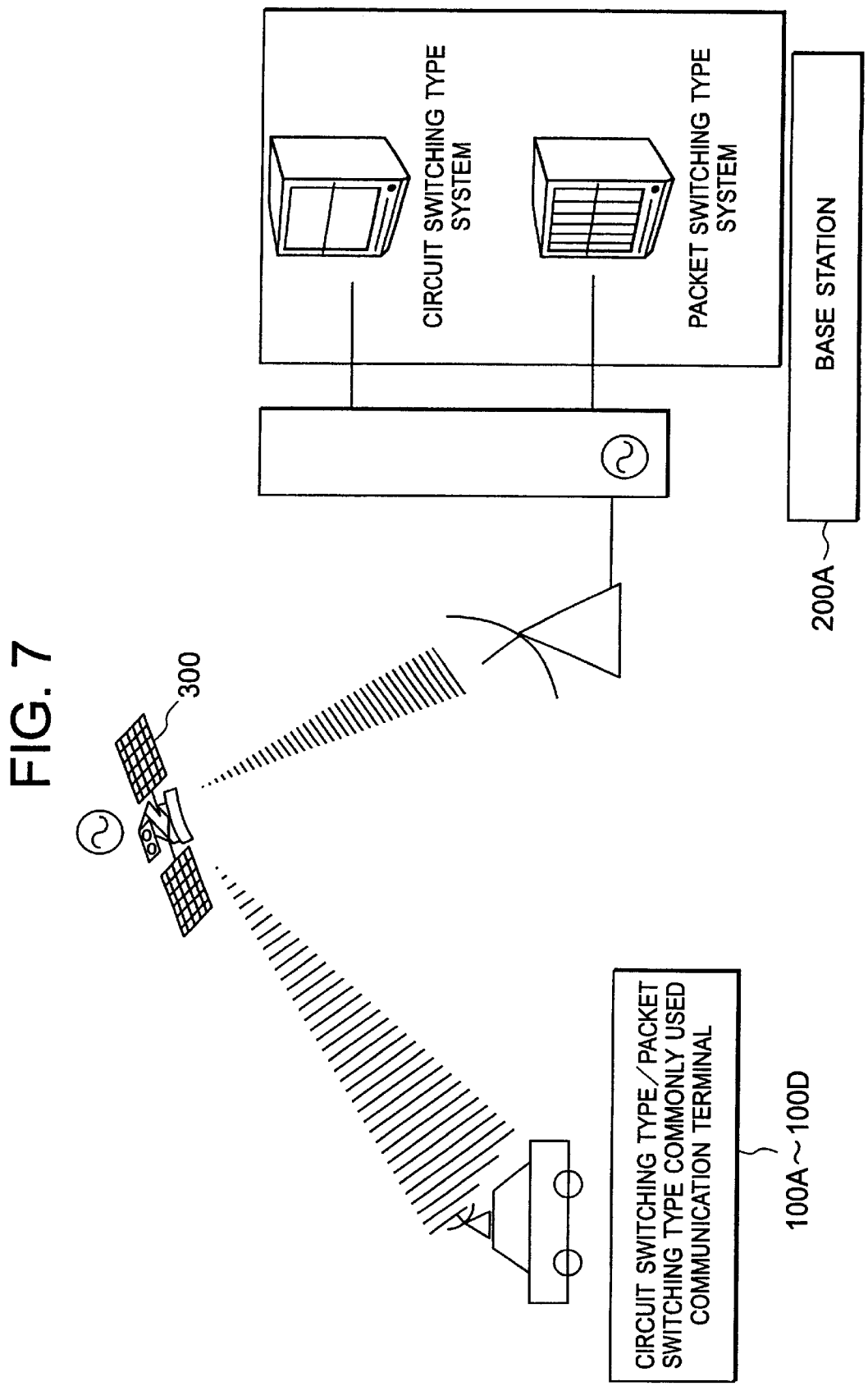
FIG. 7 is a diagram showing an arrangement of a mobile communication system in accordance with an embodiment 5 of the present invention.

A mobile communication system in accordance with an embodiment 5 of the present invention will be described with reference to the drawings. FIG. 7 is a diagram showing an arrangement of the mobile communication system in accordance with the embodiment 5 of the present invention.

In the above-described embodiments 1 to 4, the communication terminals 100A to 100D transmits and receives the electromagnetic waves directly to and from the base station 200. In the embodiment 5, as shown in FIG. 7, the communication terminals 100A to 100D relays the electromagnetic waves from the base station 200A at a communication satellite 300 once, and then transmits and receive the electromagnetic waves. Other arrangements and detailed procedure are identical with those of the above-described respective embodiments 1 to 4.

EMBODIMENT 6

Figure 8:
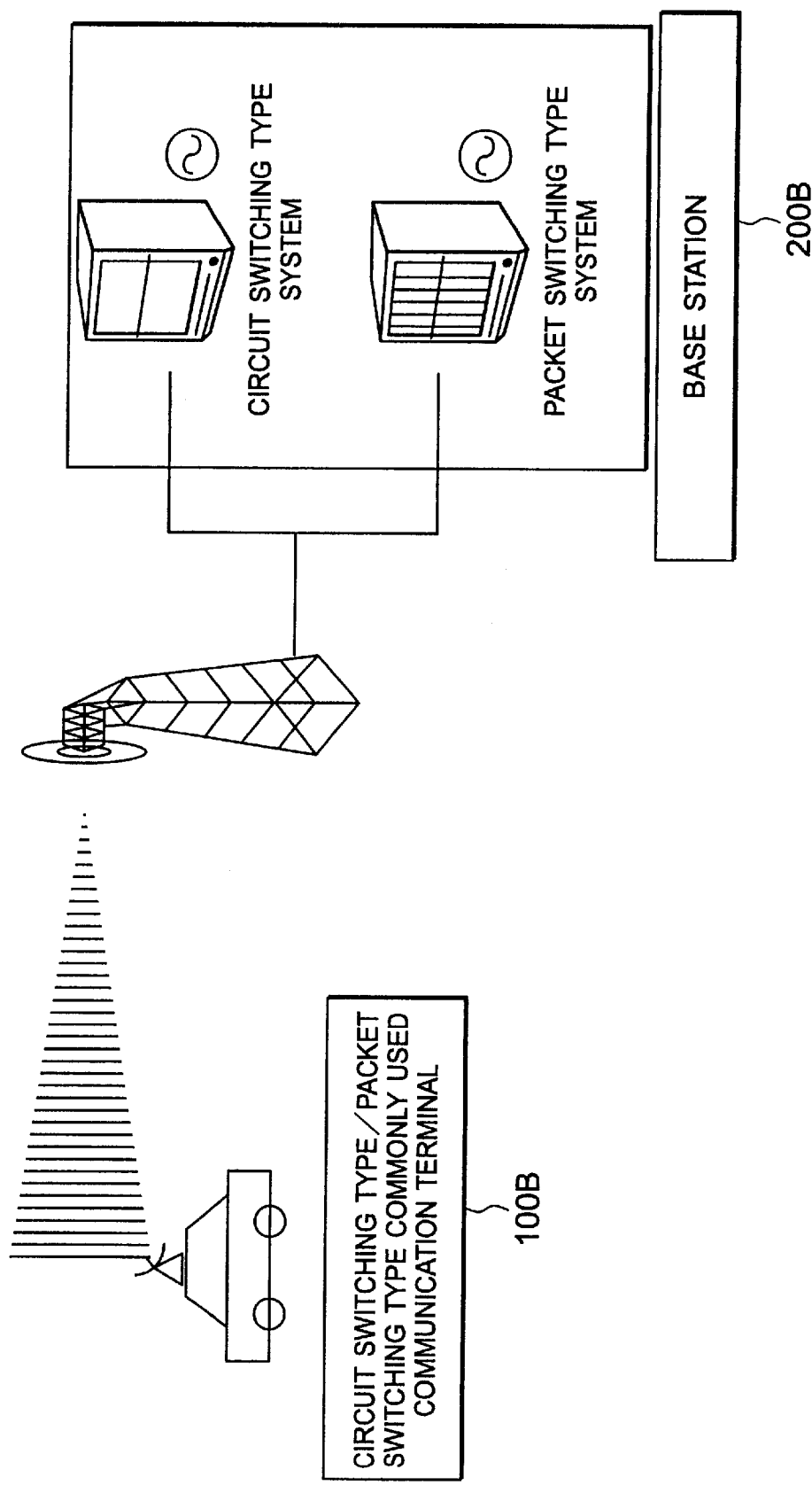
FIG. 8 is a diagram showing an arrangement of a mobile communication system in accordance with an embodiment 6 of the present invention.

A mobile communication system in accordance with an embodiment 6 of the present invention will be described with reference to the drawings. FIG. 8 is a diagram showing an arrangement of the mobile communication system in accordance with the embodiment 6 of the present invention.

In the above-described embodiments 1 to 4, the respective systems use the same reference clocks in the base station 200. In the embodiment 6, as shown in FIG. 8, the respective systems use independent reference clocks. If the respective reference clocks are high in accuracy sufficient to ignore the frequency fluctuation, they are quasi-synchronous with each other, and it can be assumed that the respective reference clocks are synchronous with each other. The frequency correcting procedure can be omitted in the initial acquiring procedure as in the above-described embodiment 2. Other arrangements and the detailed procedures are identical with those of the embodiment 2, respectively.

EMBODIMENT 7

Figure 9:
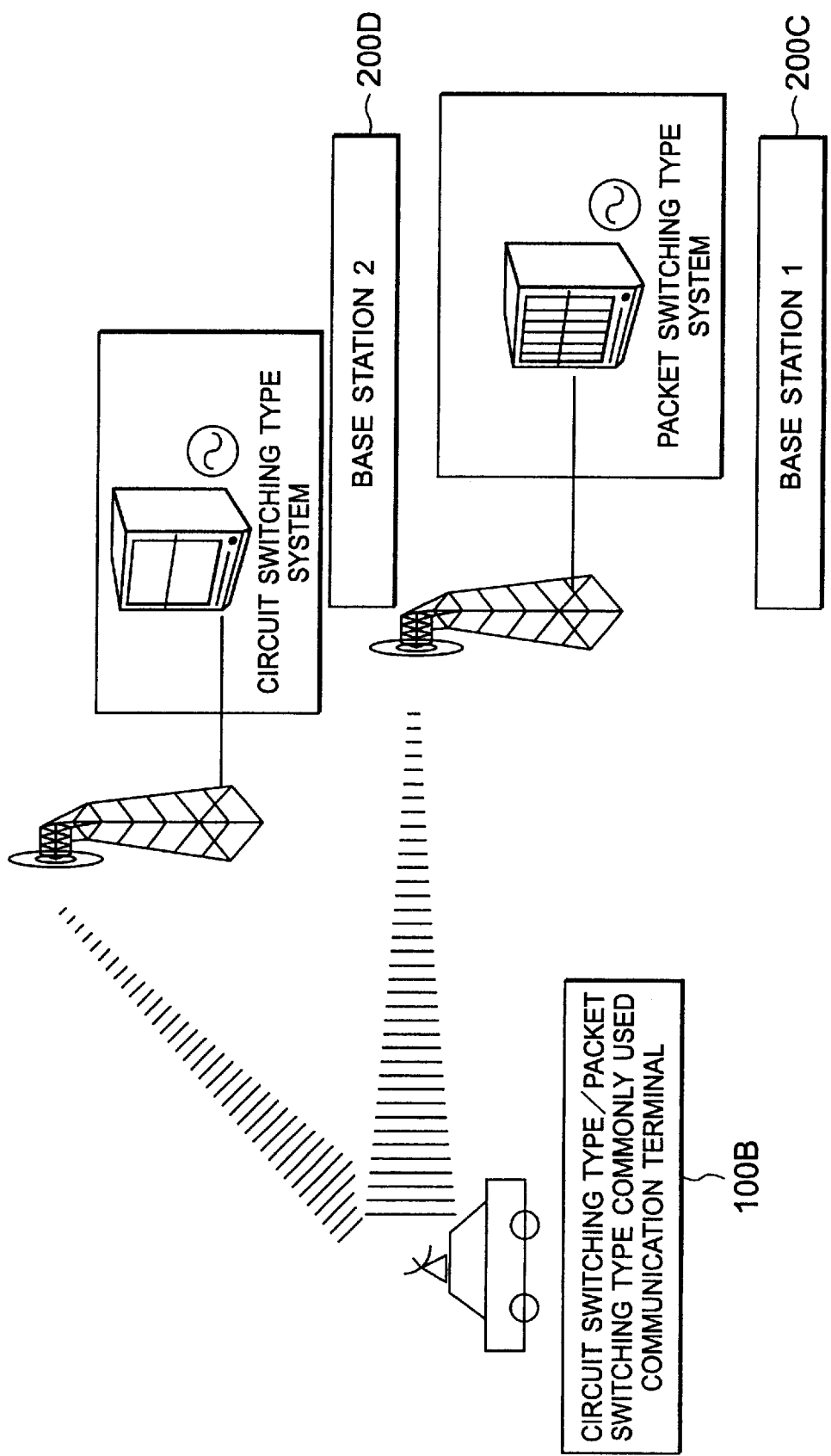
FIG. 9 is a diagram showing an arrangement of a mobile communication system in accordance with an embodiment 7 of the present invention.

A mobile communication system in accordance with an embodiment 7 of the present invention will be described with reference to the drawings. FIG. 9 is a diagram showing an arrangement of the mobile communication system in accordance with the embodiment 7 of the present invention.

In the above-described embodiment 2, the respective systems use the same reference clocks in one base station 200. The embodiment 7 is, as shown in FIG. 9, an example where there are provided two base stations 200C and 200D in which the respective systems use independent reference clocks, respectively.

If the respective reference clocks are high in accuracy sufficient to ignore the frequency fluctuation of each the base stations, and the relative travel speed of the communication terminal from the base stations is small enough to ignore the frequency deviation due to the Dopper shift, they are quasi-synchronous with each other, and it can be assumed that the respective reference clocks are synchronous with each other. The frequency correcting procedure can be omitted in the initial acquiring procedure as in the above-described embodiment 2. Other arrangements and the detailed procedures are identical with those of the embodiment 2, respectively.

EMBODIMENT 8

Figure 10:
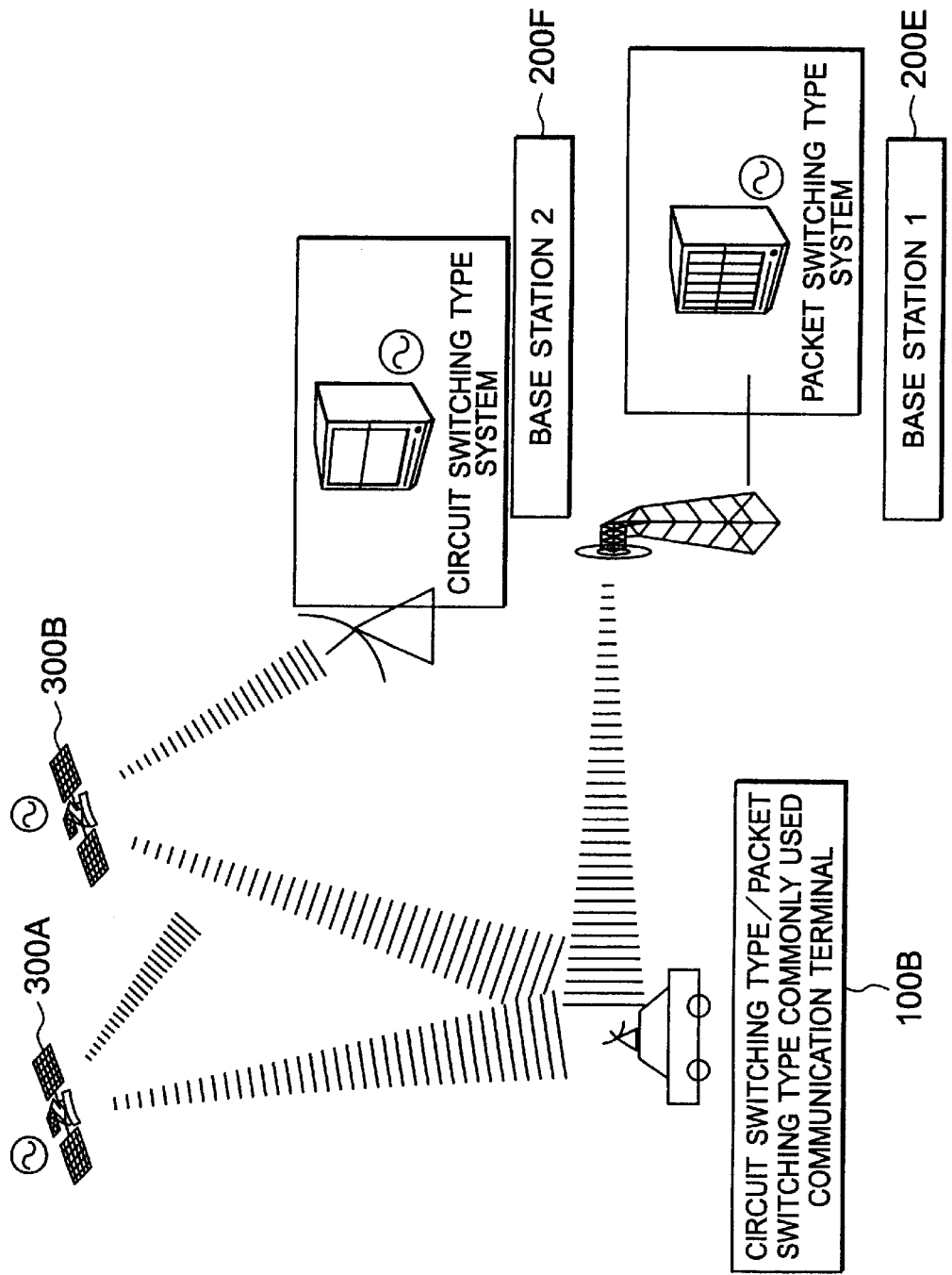
FIG. 10 is a diagram showing an arrangement of a mobile communication system in accordance with an embodiment 8 of the present invention.
Figure 11:
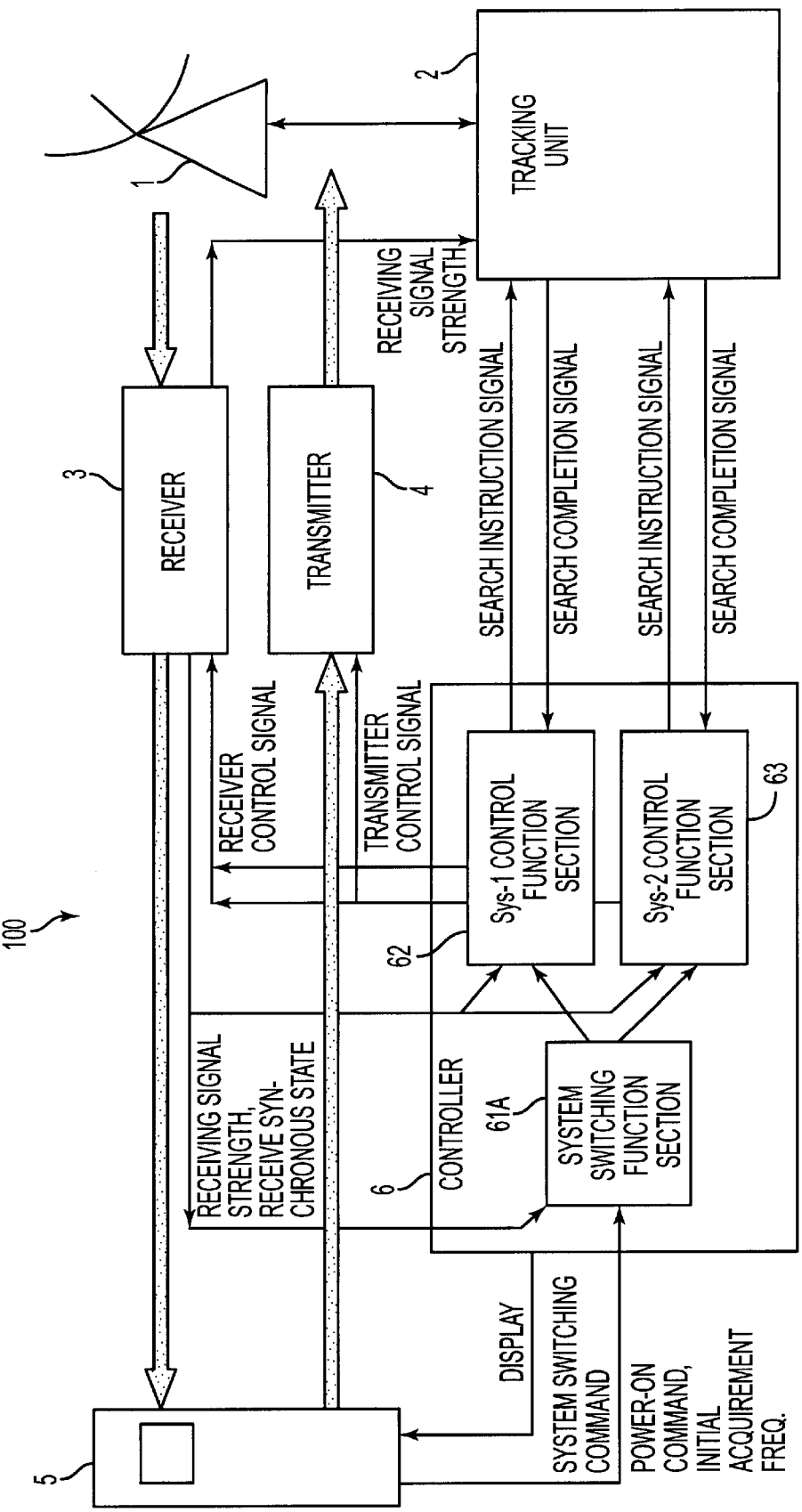
FIG. 11 is a block diagram showing an arrangement of a communication terminal of a conventional mobile communication system.
Figure 12:
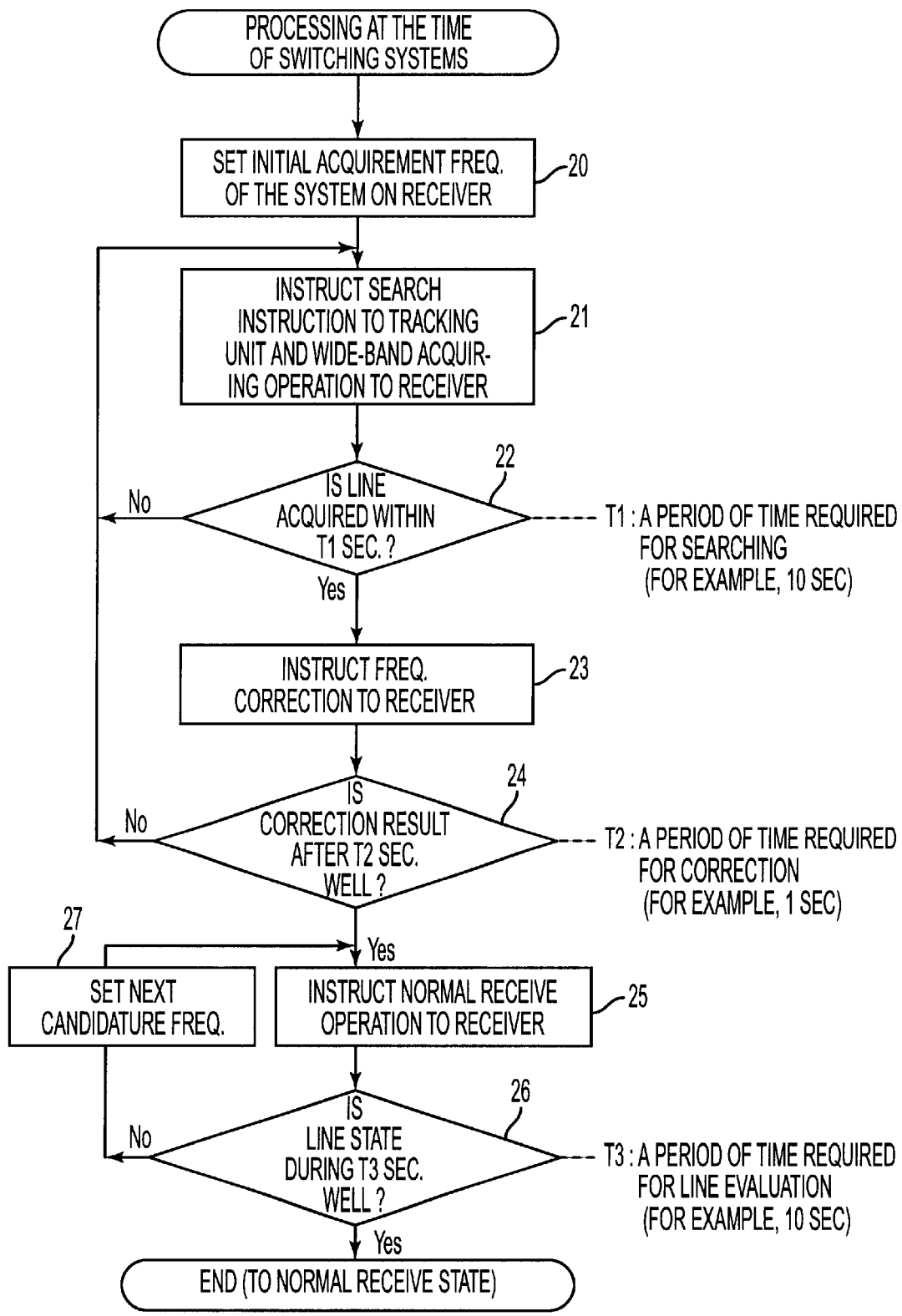
FIG. 12 is a flowchart showing the operation of a communication terminal of the conventional mobile communication system.

A mobile communication system in accordance with an embodiment 8 of the present invention will be described with reference to the drawings. FIG. 10 is a diagram showing an arrangement of the mobile communication system in accordance with the embodiment 8 of the present invention.

In the above-described embodiment 7, the communication terminal 100B transmits and receives the electromagnetic waves directly to and from the base stations 200C and 200D. In the embodiment 8, as shown in FIG. 10, the communication terminal 100B transmits and receives the electromagnetic waves to and from the base stations 200E and 200F through difference communication satellites 300A and 300B. The embodiment 7 also includes a system in which only a part (one system) is through the communication satellite.

If the reference clocks of the respective systems are high in accuracy sufficient to ignore the frequency fluctuation of each the communication satellites, and the relative travel speed of the communication terminal from the base stations is small enough to ignore the frequency deviation due to the Dopper shift, they are quasi-synchronous with each other, and it can be assumed that the respective reference clocks are synchronous with each other. The frequency correcting procedure can be omitted in the initial acquiring procedure as in the above-described embodiment 2. Other arrangements and constructions are identical with those of the above-described embodiment 7.

EMBODIMENT 9

In the above-described respective embodiments, the system switching function sections 61A to 61D provide a function of judging whether the line state of the electromagnetic waves of the system which is in use at present is well, or not. Instead, such a function may be provided on the side of the control function sections 62A to 62D and 63A to 63D. Also, without being divided into the system switching function section, the system-1 control function section and the system-2 control function section, the entire system may be realized as one function, or the respective functions indicative the respective detailed procedures may be shared freely.

As described in the above respective embodiments, according to the present invention, in the communication terminal that enables a plurality of radio communication systems to be used, since a period of time required at the time of switching the systems is reduced, the radio communication system which is subjected to the user's switching request can be utilized quickly. Accordingly, in the mobile communication system designed such that not only the user does not feel that switching between a plurality of radio communication systems is a load, but also in the mobile communication in which an automatic switching function between the radio communication systems is provided, there can be arrangementd such a communication terminal that the user does not almost feel that the radio communication systems are switched.

INDUSTRIAL APPLICABILITY

As was described above, the mobile communication system according to the present invention includes: a radio base station for transmitting and receiving the electromagnetic waves of a first radio communication system and the electromagnetic waves of a second radio communication system; and a communication terminal having an antenna for transmitting and receiving the electromagnetic waves of the first radio communication system and the electromagnetic waves of the second radio communication system, a tracking unit for directing the orientation of the antenna to an arrival direction of the electromagnetic waves, a receiver for demodulating the electromagnetic waves of the first radio communication system and the electromagnetic waves of the second radio communication system which are received, a transmitter for modulating the contents to be transmitted into the electromagnetic waves of the first radio communication system and the electromagnetic waves of the second radio communication system, a handset for indicating predetermined information to the exterior and receiving an instruction from the exterior, and a controller for controlling the above respective units and implementing an initial acquiring procedure from which a predetermined procedure is omitted when a predetermined condition is satisfied at the time of switching from the first radio communication system to the second radio communication system. With this arrangement, there is obtained such an advantage that a period of time required when the radio communication systems are switched can be reduced.

Also, as was described above, in the mobile communication system according to the present invention, the controller of the communication terminal implements the initial acquiring procedure from which a tracking procedure is omitted after the radio communication systems are switched when an arrival direction of the electromagnetic waves of the first radio communication system is identical with an arrival direction of the electromagnetic waves of the second radio communication system. With this arrangement, there is obtained such an advantage that a period of time required when the radio communication systems are switched can be reduced.

Further, as was described above, in the mobile communication system according to the present invention, the controller of the communication terminal implements the initial acquiring procedure from which a frequency correcting procedure is omitted after the radio communication systems are switched when a reference clock of the first radio communication system is synchronous with a reference clock of the second radio communication system. With this arrangement, there is obtained such an advantage that a period of time required when the radio communication systems are switched can be reduced.

Still further, as was described above, in the mobile communication system according to the present invention, the controller of the communication terminal implements the initial acquiring procedure from which a line evaluating procedure is omitted after the radio communication systems are switched when a base station of the first radio communication system is identical with a base station of the second radio communication system. With this arrangement, there is obtained such an advantage that a period of time required when the radio communication systems are switched can be reduced.

Yet still further, as was described above, in the mobile communication system according to the present invention, the controller of the communication terminal also implements the initial acquiring procedure from which a tracking procedure and a frequency correcting procedure are omitted after the radio communication systems are switched when a reference clock of the first radio communication system is synchronous with a reference clock of the second radio communication system. With this arrangement, there is obtained such an advantage that a period of time required when the radio communication systems are switched can be reduced.

Yet still further, as was described above, in the mobile communication system according to the present invention, the controller of the communication terminal also implements the initial acquiring procedure from which a frequency correcting procedure and a line evaluating procedure are omitted after the radio communication systems are switched when a base station of the first radio communication system is identical with a base station of the second radio communication system. With this arrangement, there is obtained such an advantage that a period of time required when the radio communication systems are switched can be reduced.

Yet still further, as was described above, in the mobile communication system according to the present invention, the controller of the communication terminal also implements the initial acquiring procedure from which a line evaluating procedure and a tracking procedure are omitted after the radio communication systems are switched when an arrival direction of the electromagnetic waves of the first radio communication system is identical with an arrival direction of the electromagnetic waves of the second radio communication system. With this arrangement, there is obtained such an advantage that a period of time required when the radio communication systems are switched can be reduced.

Yet still further, as was described above, in the mobile communication system according to the present invention, the controller of the communication terminal also implements the initial acquiring procedure from which a tracking procedure, a frequency correcting procedure and a line evaluating procedure are omitted after the radio communication systems are switched when a base station of the first radio communication system is identical with a base station of the second radio communication system. With this arrangement, there is obtained such an advantage that a period of time required when the radio communication systems are switched can be reduced.

Yet still further, as was described above, the mobile communication system according to the present invention further comprises a communication satellite for relaying the electromagnetic waves of the first radio communication system and the electromagnetic waves of the second radio communication system between the radio base station and the communication terminal. With this arrangement, there is obtained such an advantage that a period of time required when the radio communication systems are switched can be reduced.

Yet still further, as was described above, in the mobile communication system according to the present invention, the controller of the communication terminal implements the initial acquiring procedure from which a frequency correcting procedure are omitted after the radio communication systems are switched when a first reference clock of the first radio communication system is quasi-synchronous with a first reference clock of the second radio communication system. With this arrangement, there is obtained such an advantage that a period of time required when the radio communication systems are switched can be reduced.

As was described above, a mobile communication system according to the present invention includes: a first radio base station for transmitting and receiving the electromagnetic waves of a first radio communication system having a first reference clock; a second radio base station for transmitting and receiving the electromagnetic waves of a second radio communication system having a second reference clock which is quasi-synchronous with the first reference clock; and a communication terminal having an antenna for transmitting and receiving the electromagnetic waves of the first radio communication system and the electromagnetic waves of the second radio communication system, a tracking unit for directing the orientation of the antenna to an arrival direction of the electromagnetic waves, a receiver for demodulating the electromagnetic waves of the first radio communication system and the electromagnetic waves of the second radio communication system which are received, a transmitter for modulating the contents to be transmitted into the electromagnetic waves of the first radio communication system and the electromagnetic waves of the second radio communication system, a handset for indicating predetermined information to the exterior and receiving an instruction from the exterior, and a controller for controlling the above respective units and implementing an initial acquiring procedure from which a frequency correcting procedure is omitted at the time of switching from the first radio communication system to the second radio communication system. With this arrangement, there is obtained such an advantage that a period of time required when the radio communication systems are switched can be reduced.

Also, as was described above, the mobile communication system according to the present invention further includes: a first communication satellite for relaying the electromagnetic waves of the first radio communication system between the first radio base station and the communication terminal; and a second communication satellite for relaying the electromagnetic waves of the second radio communication system between the second radio base station and the communication terminal. With this arrangement, there is obtained such an advantage that a period of time required when the radio communication systems are switched can be reduced.

As was described above, in a mobile communication method according to the present invention in a mobile communication system which conducts radio communication between a radio base station having a first radio communication system and a second radio communication system and a communication terminal using the first radio communication system and the second radio communication system in common, the communication terminal implements an initial acquiring procedure from which a predetermined procedure is omitted when a predetermined condition is satisfied at the time of switching from the first radio communication system to the second radio communication system. with this arrangement, there is obtained such an advantage that a period of time required when the radio communication systems are switched can be reduced.

also, as was described above, in the mobile communication method according to the present invention, the communication terminal implements the initial acquiring procedure from which a tracking procedure is omitted after the radio communication systems are switched when an arrival direction of the electromagnetic waves of the first radio communication system is identical with an arrival direction of the electromagnetic waves of the second radio communication system. With this arrangement, there is obtained such an advantage that a period of time required when the radio communication systems are switched can be reduced.

Further, as was described above, in the mobile communication method according to the present invention, the communication terminal implements the initial acquiring procedure from which a frequency correcting procedure is omitted after the radio communication systems are switched when a reference clock of the first radio communication system is synchronous with a reference clock of the second radio communication system. With this arrangement, there is obtained such an advantage that a period of time required when the radio communication systems are switched can be reduced.

Still further, as was described above, in the mobile communication method according to the present invention, the communication terminal implements the initial acquiring procedure from which a line evaluating procedure is omitted after the radio communication systems are switched when a base station of the first radio communication system is identical with a base station of the second radio communication system. With this arrangement, there is obtained such an advantage that a period of time required when the radio communication systems are switched can be reduced.

What is claimed is:

1. A mobile communication system, comprising:
    a radio base station for transmitting and receiving the electromagnetic waves of a first radio communication system and the electromagnetic waves of a second radio communication system; and
    a communication terminal including:
        an antenna for transmitting and receiving the electromagnetic waves of said first radio communication system and the electromagnetic waves of said second radio communication system;
        a tracking unit for directing the orientation of said antenna to an arrival direction of the electromagnetic waves;
        a receiver for demodulating the electromagnetic waves of said first radio communication system and the electromagnetic waves of said second radio communication system which are received;
        a transmitter for modulating the contents to be transmitted into the electromagnetic waves of said first radio communication system and the electromagnetic waves of said second radio communication system;
        a handset for indicating predetermined information to an exterior of the communication terminal and receiving an instruction from the exterior; and
        a controller for controlling the above respective units and implementing an initial acquiring procedure from which a predetermined procedure is omitted when a predetermined condition is satisfied at the time of switching from said first radio communication system to said second radio communication system.

2. A mobile communication system as claimed in claim 1, wherein said controller of said communication terminal implements the initial acquiring procedure from which a tracking procedure is omitted after the radio communication systems are switched when an arrival direction of the electromagnetic waves of said first radio communication system is identical with an arrival direction of the electromagnetic waves of said second radio communication system.

3. A mobile communication system as claimed in claim 1, wherein said controller of said communication terminal implements the initial acquiring procedure from which a frequency correcting procedure is omitted after the radio communication systems are switched when a reference clock of said first radio communication system is synchronous with a reference clock of said second radio communication system.

4. A mobile communication system as claimed in claim 1, wherein said controller of said communication terminal implements the initial acquiring procedure from which a line evaluating procedure is omitted after the radio communication systems are switched when a base station of said first radio communication system is identical with a base station of said second radio communication system.

5. A mobile communication system as claimed in claim 2, wherein said controller of said communication terminal also implements the initial acquiring procedure from which a tracking procedure and a frequency correcting procedure are omitted after the radio communication systems are switched when a reference clock of said first radio communication system is synchronous with a reference clock of said second radio communication system.

6. A mobile communication system as claimed in claim 3, wherein said controller of said communication terminal also implements the initial acquiring procedure from which a frequency correcting procedure and a line evaluating procedure are omitted after the radio communication systems are switched when a base station of said first radio communication system is identical with a base station of said second radio communication system.

7. A mobile communication system as claimed in claim 4, wherein said controller of said communication terminal also implements the initial acquiring procedure from which a line evaluating procedure and a tracking procedure are omitted after the radio communication systems are switched when an arrival direction of the electromagnetic waves of said first radio communication system is identical with an arrival direction of the electromagnetic waves of said second radio communication system.

8. A mobile communication system as claimed in claim 5, wherein said controller of said communication terminal also implements the initial acquiring procedure from which a tracking procedure, a frequency correcting procedure and a line evaluating procedure are omitted after the radio communication systems are switched when a base station of said first radio communication system is identical with a base station of said second radio communication system.

9. A mobile communication system as claimed in claim 1, further comprising a communication satellite for relaying the electromagnetic waves of said first radio communication system and the electromagnetic waves of said second radio communication system between said radio base station and said communication terminal.

10. A mobile communication system as claimed in claim 1, wherein said controller of said communication terminal implements the initial acquiring procedure from which a frequency correcting procedure are omitted after the radio communication systems are switched when a first reference clock of said first radio communication system is quasi-synchronous with a first reference clock of said second radio communication system.

11. A mobile communication system, comprising:
 a first radio base station for transmitting and receiving the electromagnetic waves of a first radio communication system having a first reference clock;
 a second radio base station for transmitting and receiving the electromagnetic waves of a second radio communication system having a second reference clock which is quasi-synchronous with said first reference clock; and
 a communication terminal including:
  an antenna for transmitting and receiving the electromagnetic waves of said first radio communication system and the electromagnetic waves of said second radio communication system;
  a tracking unit for directing the orientation of said antenna to an arrival direction of the electromagnetic waves;
  a receiver for demodulating the electromagnetic waves of said first radio communication system and the electromagnetic waves of said second radio communication system which are received;
  a transmitter for modulating the contents to be transmitted into the electromagnetic waves of said first radio communication system and the electromagnetic waves of said second radio communication system;
  a handset for indicating predetermined information to an exterior of the communication terminal and receiving an instruction from the exterior; and
  a controller for controlling the above respective units and implementing an initial acquiring procedure from which a frequency correcting procedure is omitted at the time of switching from said first radio communication system to said second radio communication system.

12. A mobile communication system as claimed in claim 11, further comprising:
 a first communication satellite for relaying the electromagnetic waves of said first radio communication system between said first radio base station and said communication terminal; and
 a second communication satellite for relaying the electromagnetic waves of said second radio communication system between said second radio base station and said communication terminal.

13. A mobile communication method in a mobile communication system which conducts radio communication between a radio base station having a first radio communication system and a second radio communication system and a communication terminal using said first radio communication system and said second radio communication system in common;
 wherein said communication terminal implements an initial acquiring procedure from which a predetermined procedure is omitted when a predetermined condition is satisfied at the time of switching from said first radio communication system to said second radio communication system;
 wherein said communication terminal implements the initial acquiring procedure from which a tracking procedure is omitted after the radio communication systems are switched when an arrival direction of the electromagnetic waves of said first radio communication system is identical with an arrival direction of the electromagnetic waves of said second radio communication system.

14. A mobile communication method in a mobile communication system which conducts radio communication between a radio base station having a first radio communication system and a second radio communication system and a communication terminal using said first radio communication system and said second radio communication system in common;
 wherein said communication terminal implements an initial acquiring procedure from which a predetermined procedure is omitted when a predetermined condition is satisfied at the time of switching from said first radio communication system to said second radio communication system;
 wherein said communication terminal implements the initial acquiring procedure from which a frequency correcting procedure is omitted after the radio communication systems are switched when a reference clock of said first radio communication system is synchronous with a reference clock of said second radio communication system.

15. A mobile communication method in a mobile communication system which conducts radio communication between a radio base station having a first radio communication system and a second radio communication system and a communication terminal using said first radio communication system and said second radio communication system in common;

wherein said communication terminal implements an initial acquiring procedure from which a predetermined procedure is omitted when a predetermined condition is satisfied at the time of switching from said first radio communication system to said second radio communication system;

wherein said communication terminal implements the initial acquiring procedure from which a line evaluating procedure is omitted after the radio communication systems are switched when a base station of said first radio communication system is identical with a base station of said second radio communication system.

* * * * *